March 28, 1967 R. C. BLACKMORE 3,311,053

METHOD OF FORMING A CURVED PRINTING PLATE

Filed July 6, 1964 3 Sheets-Sheet 1

March 28, 1967 R. C. BLACKMORE 3,311,053

METHOD OF FORMING A CURVED PRINTING PLATE

Filed July 6, 1964 3 Sheets-Sheet 2

United States Patent Office 3,311,053 Patented Mar. 28, 1967

3,311,053

METHOD OF FORMING A CURVED PRINTING PLATE

Roy Clifford Blackmore, Esher, Surrey, England, assignor to Rotary Plates Limited, London, England, a British company Filed July 6, 1964, Ser. No. 380,402
Claims priority, application Great Britain, July 10, 1963, 27,395/63
9 Claims. (Cl. 101—401.1)

Figure 1:
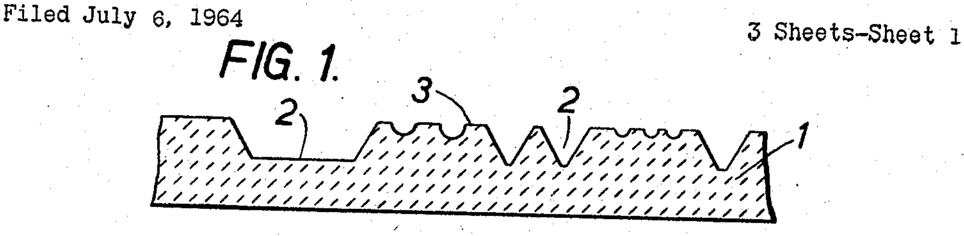
Figure 2:
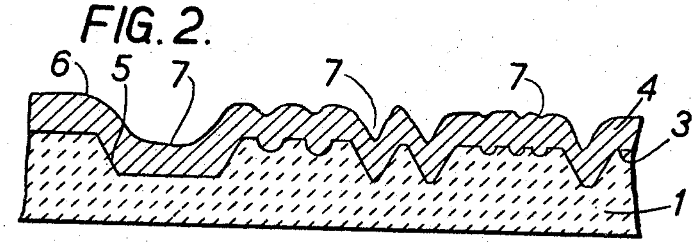

The invention relates to a method of bending electrotypes and other relief printing plates.

It is difficult to bend accurately a sheet of uneven relief, for example a relief printing plate. In the bending of electrotypes it is, therefore, necessary to ensure that all non-printing or "white" areas be packed out with solid metal to within a very short distance, for example, ⅛ inch, of live work and to the same height or thickness as the live or printing areas of the electrotype. In practice, this packing out of the electrotypes is generally achieved by similarly packing out the non-printing areas of the original pattern plates from which the thermo-formed electrotype mould is taken, on to which mould the electrotype shell is grown by electrodeposition. This procedure of packing out is necessary in order to support the non-printing areas of the flat, finished electrotype during the bending operation in order to prevent their collapse and in order to reduce the occurrence of distortions in the printing face.

The insertion of the packing or "dead" metal in the non-printing areas of the original pattern plates is a lengthy operation where intricate or irregular subjects are concerned. The corresponding dead metal in the curved, duplicate electrotype has subsequently to be removed by a laborious routing operation. A curved or rotary electrotype is then obtained which still contains a number of unavoidable, small distortions in the form of "cupping" around solid areas and small isolated characters which have remained flat.

It is an object of the invention to provide a method of bending printing plates, particularly electrotypes, in which some at least of the disadvantage inherent in the method referred to is mitigated.

According to the invention, an electrotype or other relief printing plate is curved or subjected to bending when in contact with an independent, complementary member which supports and fills out the non-printing areas of the electrotype. It is to be understood that the independent member may be secured, if necessary, to the electrotype during the bending operation, for example by means of an adhesive or by mutually interlocking surface features such as a screen or clump, but that it is such that it can be removed from the electrotype by an operation which is much simpler than the laborious routing operation for removing dead metal in the method hereinbefore referred to. Thus, for example, where the independent member is secured to the electrotype by means of an adhesive, the independent member or the major part of it may be separated from the electrotype by peeling one member from the other.

In one method of carrying the invention into effect, a rigid plastic mould may be thermoformed on to an unmodified original or pattern plate, that is to say, a pattern plate in which the non-printing areas have not been packed out. A suitable material from which the mould may be formed is, of example, a thermoplastic sheet of a vinyl chloride/vinyl acetate copolymer available on the market under the name "Vinylite VR 250/3." The thermo-forming is carried out in a manner such that the mould is permitted to penetrate or extend into the non-printing or white areas of the original plate to the depth which it is required to reproduce in the curved electrotype. On the reverse side of the resultant thermoformed mould there will be depressions corresponding to the whites of the printing face, that is, corresponding to the non-printing areas on the front face of the mould. These depressions on the reverse side may be removed by planing the back of the mould, preferably while the mould is still in intimate contact with the original, in such manner that the back of the mould and the printing face of the pattern plate are rendered parallel. Advantageously the mould is held in intimate contact with the original plate by a vacuum method.

In another method, a rigid plastic mould may be compression-moulded from a thermosetting sheet material, for example, a sheet of fiberboard or fibrous material impregnated with a thermosetting phenol-aldehyde resin such as that marketed under the name of "Red Top T-172-A." In this method the mould will preferably be produced between parallel, flat platens to give a mould having a flat back and which does not, in consequence, require planing.

An electrotype shell is grown by electrodeposition on to the face of this mould and the electrotype is then backed and the electrotype, after backshaving, is curved, for example on a three roll bender, whilst still in intimate contact with the mould. The non-printing or white areas in the electrotype will then be supported by the solid rigid plastic of the mould, so obviating the need for packing out the non-printing areas in the original pattern plate and thus eliminating the step of routing dead metal from the electrotype.

The clump or bearer of the electrotype, that is to say, the surround to the printing face of the electrotype adjacent to its edge, is preferably provided with a pattern of dots, lines or other means to key with the mould. This prevents or mitigates slipping between the mould and the electrotype during passage of the assembly through the bending rolls and consequently mitigates distortion of the electrotype during the operation of bending.

It has been found that a rotary curved electrotype produced in this manner generally has fewer surface imperfections than plates curved by the methods commonly employed at the present time.

The back of the mould on to which the electrotype is grown need not, as hereinbefore described, be shaved or planed to render its back or reverse side parallel with the printing areas of the mould, but the back of the mould may be filled in, for example, with a resin, and so rendered parallel with the face. Thus the back of the mould may be filled in with a casting resin which sets at a low temperature, for example a suitable polyester or epoxide resin, the resin containing a curing agent being poured or spread over the back of the mould. Advantageously, the mould will be held in intimate contact, preferably by a vacuum method, with the original pattern plate on a horizontal table or platen whilst the resin is poured or spread over its back, and a second parallel platen be brought into contact with the filled back of the mould to ensure that the outer face of the filling resin sets parallel to the printing face of the mould. Instead of a liquid casting resin, the back of the mould may be filled with a powdered composition comprising a thermoplastic or thermosetting resin. The powder is spread over the back of the mould in an amount sufficient to produce a level surface, and the powdered backing is subsequently caused to fuse either by the application of heat or when activated by a suitable solvent or solvent vapour.

It will be understood that when the back of the mould is filled any suitable composition may be used for such filling operation. It has been found that a number of commercially available filling and adhesive compositions commonly used in the building, engineering and woodworking industries are suitable for filling out the back of moulds, for example, the cellulose derivative sold under the name "Polyfilla."

In another method of carrying out the method according to the invention, a face mat or matrix may be produced from the electrotype itself, the face matrix serving to support the electrotype during the bending operation. Alternatively, the face matrix, instead of being thermoformed, may be compression-moulded from thermosetting sheet material (such as the "Red Top T–172–A" material hereinbefore referred to), between the electrotype and a flat backing sheet to produce a flat-backed face matrix without the need for planing. The method of producing a face matrix as the independent member to be passed through the bending apparatus with the electrotype, is particularly useful in most cases where the moulds are supplied from another source and are not produced in the manner specifically hereinbefore described.

Two methods of carrying out the invention are hereinafter described by way of example with reference to FIGURES 1 to 11 of the accompanying diagrammatic drawings, in which the several figures show stages in the production of a curved electrotype.

FIGURE 1 shows a section of part of an original or pattern plate 1 which is unmodified, that is to say, a pattern plate in which the white or non-printing areas 2 in its printing face 3 have not been packed out. The pattern plate 1 is provided with a surround, clump or bearer having an etched screen formation in its surface (not shown). A sheet 0.055 inch thick of a vinyl acetate-vinyl chloride copolymer known under the name "Vinylite VR 250/3" is laid on the printing face 3 of the pattern plate 1 and in known manner is softened by heat to produce under pressure and subsequent cooling a mould 4 (FIGURE 2) the face 5 of which conforms precisely with the printing face 3 of the pattern plate 1. The reverse side 6 of the mould 4 contains depressions 7 which approximately correspond to the non-printing areas 2 in the printing face of the pattern plate 1.

Figure 3:
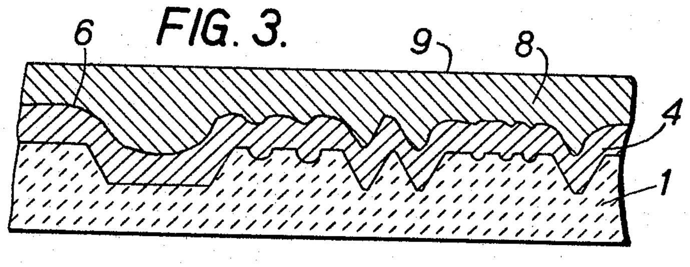
Figure 4:
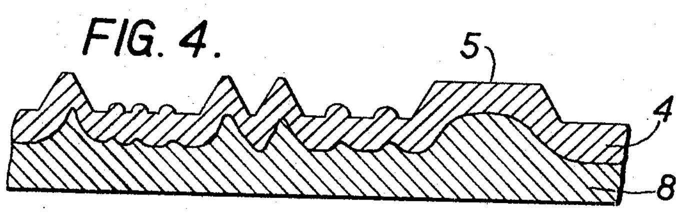
Figure 5:
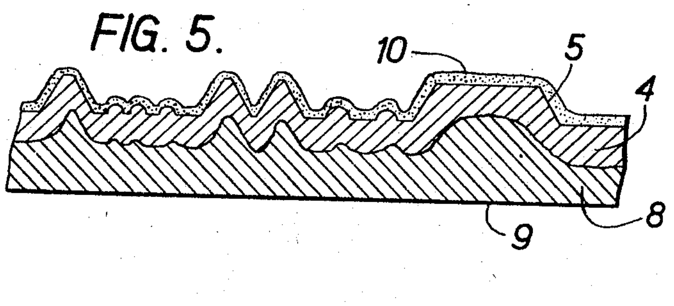

With the mould 4 still on the pattern plate 1, a relatively thick layer of a liquid epoxy casting resin containing a curing agent is spread over the reverse side 6 of the mould 4, the amount of liquid resin being sufficient to fill the depressions 7 and cover the higher areas on the reverse side 6 to the desired depth. For this purpose, the liquid casting resin will be confined by means of side walls until the resin has cured and solidified. When the resin has solidified, its outer surface is shaved to produce a mould backing 8 having its outer surface 9 parallel with the printing face of the pattern plate 1 (FIGURE 3). The step of filling in the depressions in the back of the mould 4 may be avoided by using sufficient material to form the mould to permit the back of the mould itself to be planed or shaved to render it parallel with the back of the pattern plate.

The mould 4 with its backing layer 8 is removed from the pattern plate 1 (FIGURE 4) and the printing face 5 of the mould 4 is sprayed in known manner with a layer of silver to render it conductive. An electrotype shell 10 (FIGURE 5) is then grown on the printing face 5 of the mould 4 in known manner by making the mould the cathode in a suitable electrolytic bath, for example, a bath containing acidified copper sulphate. The thickness of the copper shell 10 is, for example, 0.015 inch.

Figure 6:
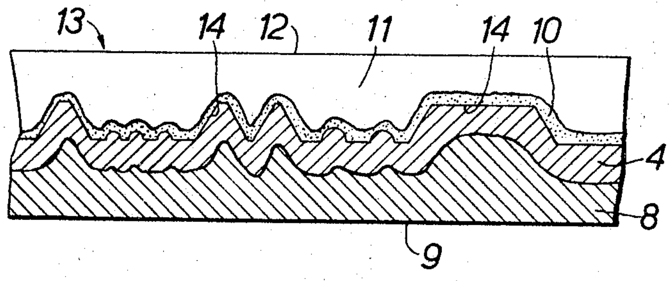

The electrotype shell 10, whilst still on the backed mould 4, is then backed up electrolytically in known manner with a backing 11 of a lead/tin alloy and the outer surface 12 of the backing layer 11 is planed or shaved to render it parallel with the printing face 5 of the mould, so producing an assembly or unit 13 comprising the backed electrotype shell 10 in position on its backed mould 4 (FIGURE 6).

Figure 7:
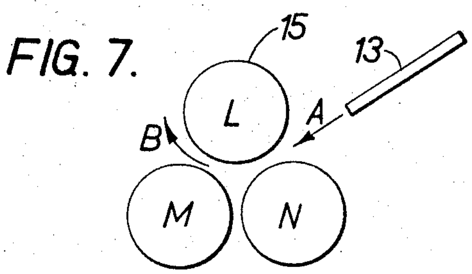
Figure 8:
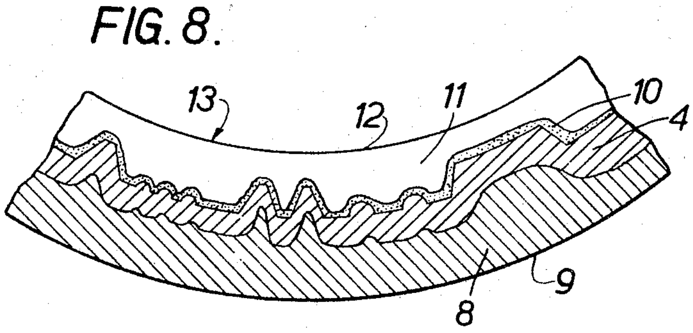
Figure 9:
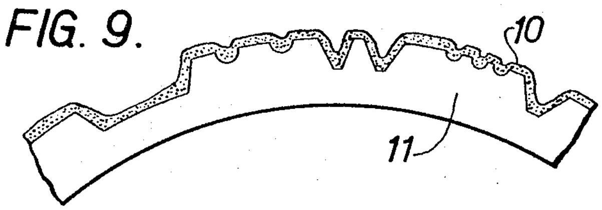

The assembly 13 in which the white or non-printing areas 14 of the shell 10 are fully supported by the mould 4, is then passed through a bending machine 15 of known kind, diagrammatically illustrated in FIGURE 7. The bending machine 15 comprises three cooperating rolls L, M and N and the electrotype assembly 13 is passed into the bending machine in the direction of the arrow A and is withdrawn from the bending machine in the direction of the arrow B. The assembly 13 is curved during its passage through the bending machine substantially into the form illustrated in FIGURE 8. The backed mould 4 is then stripped from the assembly 13 as it leaves the bending rolls to leave the curved and backed electrotype shell 10 shown in FIGURE 9. As the flat electrotype was fully supported in its passage through the bending machine, no collapse of the non-printing areas occurs and substantially no distortion of the face of the electrotype takes place. The curved electrotype, after removal of its mould 4, as shown in FIGURE 9, and after trimming and bevelling is then substantially ready for locking on a printing cylinder and none of the laborious routing work hitherto required is necessary since the curved electrotype stripped from its mould has no dead metal in its non-printing areas.

Figure 10:
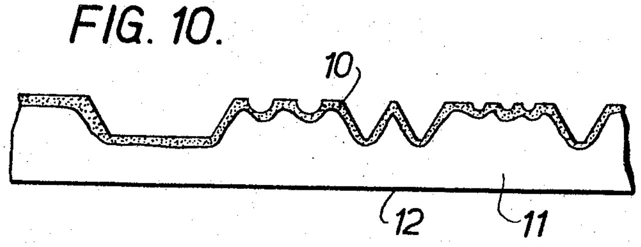
Figure 11:
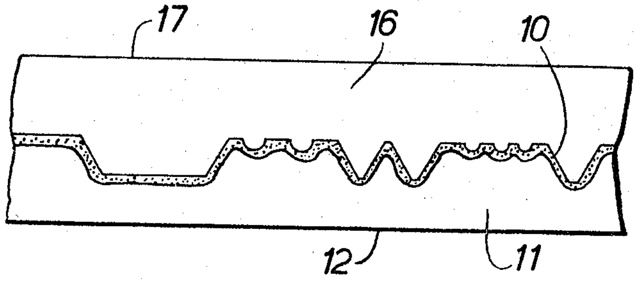

An alternative method of carrying out the invention is illustrated in FIGURES 10 and 11. After the shell 10 has been electrodeposited and it has been provided, either electrolytically or with molten alloy, with its backing layer 11, the backed electrotype is stripped from its mould to form the unit shown in FIGURE 10. A fibre-reinforced thermosetting phenolformaldehyde resin in sheet or particulate form, is then placed over the shell 10 and the composite is held under pressure between parallel platens to cure the phenol-formaldehyde resin, the platen in contact with the phenolic resin being heated. In this manner, a thermoset face matrix 16 is formed having an upper surface 17 which is parallel with the printing face of the shell 10. This assembly, in which the electrotype shell 10 is fully supported from both sides, is then passed through a bending machine as described with reference to FIGURE 7, to form a curved assembly from which the face matrix 17 is then stripped as it emerges from the bending rolls to leave a curved electrotype of the kind shown in FIGURE 9.

In the two methods specifically described with reference to the accompanying drawings, the clump or bearer of the shell 10 was, in the manner hereinbefore described, provided with a pattern of dots to mitigate slip between the shell and the mould or face mat during passage through the bending machine.

I claim:

1. A method of forming a curved electrotype which comprises moulding by heat and pressure a vinyl acetate-vinyl chloride copolymer on a pattern plate having a printing face to produce a mould which conforms with the printing face of the pattern and having the reverse side of the mould containing depressions which approximately correspond to the nonprinting areas in the printing face of the pattern plate, coating the reverse side of the mould with a liquid epoxy resin containing a curing agent in an amount sufficient to fill the depressions and cover the higher areas on the reverse side of the mould, curing the epoxy resin to solidify it and form a mould backing, removing the mould with its backing from the pattern plate, growing an electrotype shell on the printing face of the mould, electrolytically backing the electrotype shell with a lead-tin alloy, stripping the backed electrotype from its mould to form a unit consisting of the electrotype shell on the lead-tin alloy base, placing a fibre reinforced thermosetting phenol-formaldehyde resin over said shell, heating under pressure and curing the phenolformaldehyde resin to form a solid resin having an upper surface which is parallel with the printing face of the electrotype shell, passing the assembly through rolls effective to curve the assembly, and removing the face matrix from the curved assembly.

2. A method of bending a relief printing plate, which comprises forming an assembly of the relief printing plate having a printing face, and an independent, complementary member by compression moulding a thermosetting resin on said printing face in such a manner that the complementary member is in intimate contact with the whole of the printing and non-printing areas on the printing face and all of the non-printing areas are filled, and the back of the printing plate in the assembly is substantially parallel to the back of the complementary member, passing the assembly through a machine effective to curve printing plates, and separating the complementary member from the curved printing plate as the assembly leaves the said machine.

3. A method of curving an electrotype, which comprises forming an assembly of the electrotype having a printing face, and an independent complementary member by compression moulding a thermosetting resin on said printing face in such a manner that the complementary member is in intimate contact with the whole of the printing and non-printing areas on the printing face and all of the non-printing areas are filled, and the back of the electrotype in the assembly is substantially parallel to the back of the complementary member, and passing the assembly as a unit through a machine effective to curve an electrotype.

4. A method according to claim 3, in which the electrotype is surrounded by a bearer having a pattern effective to key with the complementary member during passage of the assembly through the bending machine.

5. A method according to claim 3, in which the thermosetting resin is a phenolformaldehyde resin.

6. A method according to claim 3, in which the thermosetting resin is a fibre-reinforced phenol-formaldehyde resin.

7. A method of forming a curved electrotype, which comprises electrolytically growing an electrotype shell on a compression moulded thermoset resin mould, backing up the shell with a metallic backing, rendering the outer surface of said metallic backing substantially parallel with the flat printing areas on the face of the shell, providing the mould with a rear surface which is substantially parallel with the printing face of the shell, passing through a set of bending rolls an assembly of the mould and electrotype in which the printing face of the electrotype engages with the mould in the same manner in which the electrotype shell was grown whereby the non-printing areas of the electrotype are supported and filled out by the high areas of the mould, and removing the curved, backed electrotype from the curved assembly as it leaves the bending rolls.

8. A method according to claim 7, in which, the rear surface of the mould is formed parallel with the face of the mould during the formation of the mould itself.

9. A method of forming a curved electrotype, which comprises forming from a pattern plate a mould, electrolytically depositing an electrotype shell on the face of the mould, electrolytically depositing a metallic backing layer on the electrotype shell, separating the backed electrotype shell from the mould, rendering the rear surface of said backing layer substantially parallel with the printing face of the shell, forming by compression moulding a face matrix on the printing face of the electrotype shell in a manner such that the face matrix is in intimate contact with the whole of the printing and non-printing areas on the face of the shell and all the non-printing zones in the shell are filled by compression moulding a thermosetting resin thereon, providing the face matrix with a rear surface which is parallel with the printing face of the shell, passing the assembly of face matrix and shell through a set of rolls effective to curve the assembly, and removing the face matrix from the curved assembly as it leaves the bending rolls.

References Cited by the Examiner

UNITED STATES PATENTS

| | | | |
|---|---|---|---|
| 988,763 | 4/1911 | Flower | 101—401.3 X |
| 1,565,216 | 12/1925 | Smith | 101—401.1 |
| 2,182,802 | 12/1939 | Frazier | 101—401.1 |
| 2,587,439 | 2/1952 | Bungay | 101—401.3 |
| 2,722,261 | 11/1955 | Bishop. | |
| 3,010,390 | 11/1961 | Buskes | 101—149.2 |
| 3,145,654 | 8/1964 | Johnson et al. | 101—401.1 |

ROBERT E. PULFREY, *Primary Examiner.*

J. R. FISHER, *Assistant Examiner.*